Dec. 25, 1934. A. P. FERGUESON 1,985,538
VENTILATING WINDOW FOR MOTOR CARS
Filed March 31, 1933
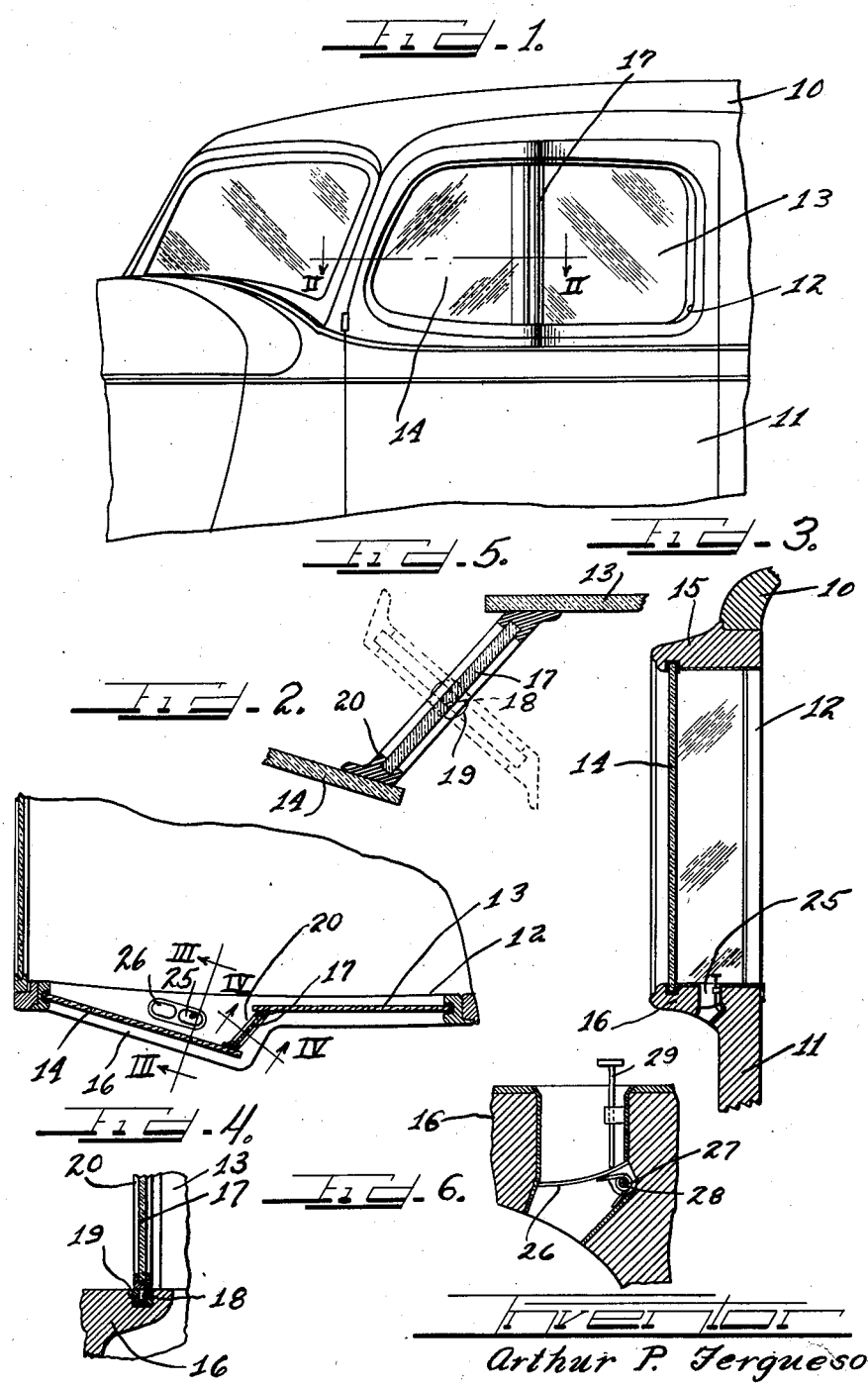

Patented Dec. 25, 1934

1,985,538

UNITED STATES PATENT OFFICE 1,985,538

VENTILATING WINDOW FOR MOTOR CARS

Arthur P. Fergueson, Detroit, Mich., assignor to Oakes Products Corporation, North Chicago, Ill., a corporation of Michigan Application March 31, 1933, Serial No. 663,676

4 Claims. (Cl. 296—44)

This invention relates to a ventilating device for vehicles, and more particularly to a ventilating window for automobiles.

An object of this invention is to provide an improved ventilating device for the body of a vehicle such as an automobile and which is effective by reason of the forward motion of the vehicle to suck out air from the interior of the vehicle.

Another object of the invention is to provide a ventilating device for a vehicle of such construction that the suction incident to the forward motion of the vehicle may not only be utilized to withdraw air from the vehicle but may also be utilized to withdraw ashes and the like dropped into a receptacle carried by the ventilating device.

Still another object of the invention is to provide an improved ventilating device for an automobile which may be built in and comprise a part of a window of the vehicle body.

A still further object of the invention is to provide an automobile window with a built-in ventilating device which is readily adapted to be streamlined to conform with the general contour of the streamlined shape of the vehicle body.

In accordance with the general features of this invention, there is provided a ventilator for an automobile which has a glass wing set at an angle to the center line of the vehicle and permanently supported by means of metal extensions from the door associated therewith. The glass wing is associated with a window which in itself consists only of a partial glass closure for the entire window opening and is disposed at the rear end of the window opening. The window wing is fixed, but the window glass proper may be raised and lowered in the conventional manner. Interposed between the window wing and the window proper there is a third ventilating section which is disposed between the rearward edge of the window wing and the forward edge of the window pane proper. This section is adjustable into open and closed positions with regard to the associated window opening.

Another feature of my invention relates to the idea of incorporating in one of the supports for the deflector an ash receptacle which permits of the emptying of the contents thereof directly into the street. Also the suction incident to the forward motion of the vehicle necessarily will act to draw the ashes out of the receptacle when it is desired to discharge the contents thereof.

Other objects and features of this invention will more fully appear from the following detailed description taken in connection with the accompanying drawing which illustrates a single embodiment thereof, and in which Figure 1 is a fragmentary side view of a vehicle body embodying the ventilating device of my invention.

Figure 2 is a fragmentary sectional view taken on the line II—II of Figure 1 looking downwardly.

Figure 3 is a fragmentary vertical sectional view taken on the line III—III of Figure 2 looking in the direction indicated by the arrows.

Figure 4 is a fragmentary vertical sectional view taken on the line IV—IV of Figure 2 looking in the direction indicated by the arrows.

Figure 5 is an enlarged sectional view of the intermediate movable section shown in Figure 2, and Figure 6 is an enlarged sectional view of the ash receptacle shown in Figure 3.

The reference character 10 designates generally an automotive vehicle body which includes a door 11 which may be of any suitable or conventional shape. In Figure 1 of the drawing it will be noted that I have illustrated my invention as being applied to a streamlined automobile inasmuch as the modern automobile is of that character.

The door 11 includes a window opening 12 approximately one-half of which is adapted to be closed by a window pane 13 (Figure 2) arranged to be raised and lowered in the usual way. This window pane 13 is disposed at the rear end of the window opening 12.

The forward end of the window opening 12 has associated with it a glass wing 14 set at an angle to the center line of the car and permanently supported by means of triangular metal extensions 15 and 16 on the door 11. These extensions 15 and 16 may comprise separate brackets secured to the door at the window opening 12 or as illustrated may be made from the material of that portion of the door defining the window opening. That is to say, these extensions may be stamped from the window section of the door and pressed outwardly to form the triangular top and bottom portions 15 and 16 which carry the glass wing 14. Also it will be noted from Figure 3 that the upper and lower ends of the glass wing 14 are set in grooves formed in the two triangular brackets 15 and 16.

A third glass device is interposed between the rearward edge of the wing 14 and the forward edge of the glass pane 13 as best shown in Figs. 2 and 5. This third glass member is designated generally by the reference character 17 and is disposed vertically between the pane 13 and the wing 14 as well as extends obliquely away from the forward edge of the pane 13 toward the rear edge of the wing 14.

This third glass member 17 is adapted to pivot on a vertical axis disposed midway its sides. This axis extends through pivots at the upper and lower ends of the member 17. Each of these pivots embodies pivot pins 18 (Figures 4 and 5) journalled in bearing 19 carried in the corresponding bracket or extension. Obviously, by moving the member 17 to the dotted or ventilating position shown in Figure 5 the air inside of the vehicle body may be withdrawn through the opening normally closed by the member 17 to permit of the circulation of fresh air through the interior of the vehicle body.

Of course, it will be appreciated that irrespective of whether this third window section 17 is in an open or closed position the window pane 13 may be raised or lowered to any desired position. This enables a variety of adjustments for various ventilating conditions incident to the use and operation of the vehicle.

Attention is directed to the fact that the glass member 17, as shown in Figures 4 and 5, is disposed in a suitable frame 20 and that it is the frame 20 which has the pivot pins 18 secured thereto. Also, if it is so desired, the edges of the vertical sides of the window section 17 may be provided with felt or rubber strips for engaging the adjacent ends of the glass pane 13 and the window wing 14.

The angularity of the window section 17 is such with reference to the window wing 14 and the glass pane 13 that it must be revolved clockwise when it is desired to open it and counterclockwise when it is desired to move it into a closed position. This operation of the intermediate glass deflector section 17 may be effected manually by the operator of the vehicle (Figure 5).

Another feature of my invention relates to the provision of an ash tray or receptacle 25 in the lower triangular metal supporting bracket 16 (Figures 2, 3 and 6). This ash receptacle 25 may have adjoining it a match receptacle or the like designated by the reference numeral 26 in Figure 2.

In Figure 6 it will be noted that the ash receptacle has disposed within it a pivotally supported bottom 26 which is at all times urged upwardly by means of a spring 27 connected to the pivot 28 of the bottom. Secured to the bottom is an upwardly extending plunger rod 29 which may be suitably guided in the ash receptacle 25. This plunger rod is so disposed that by pressing downwardly on it the hinged bottom 26 may be moved to an open position to permit the suction incident to the forward movement of the vehicle to withdraw the ashes and the like from the ash receptacle. Also, when the automobile is standing still the downward movement of this plunger 29 opens the bottom of the receptacle so that the contents thereof may gravitate therefrom.

Now I desire it understood that although I have illustrated and described in detail the preferred embodiment of the invention, the invention is not to be thus limited but only insofar as defined by the scope and spirit of the appended claims.

I claim as my invention:

1. A ventilating closure for an automotive vehicle window opening comprising an angular window wing disposed at the forward end of the opening and extending outwardly and rearwardly therefrom, said wing affording a partial closure for the opening, a window pane closure for the remaining portion of the window opening and disposed in the opening, and a ventilating section positioned between the rear and forward edges of said wing and window pane respectively, said section being movable into open position to permit air to circulate through said opening and being movable into closed position to cooperate with the wing and pane in forming a tight closure for the entire window opening, said window pane being arranged to be lowered and raised in said window opening into any desired position and so as to enable a variety of adjustments for various ventilating conditions incident to the operation of the vehicle.

2. A ventilating closure for an automotive vehicle window opening comprising an angular window wing disposed at the forward end of the opening and extending outwardly and rearwardly therefrom, said wing affording a partial closure for the opening, a window pane closure for the remaining portion of the window opening and disposed in the opening, and a ventilating section positioned between the rear and forward edges of said wing and window pane respectively, said section being movable into open position to permit air to circulate through said opening and being movable into closed position to cooperate with the wing and pane in forming a tight closure for the entire window opening, said window ring being at all times in a fixed position and said window pane being arranged to be lowered and raised into various ventilating positions without affecting the adjustability of the ventilating section into open and closed positions.

3. A ventilating closure for an automobile vehicle window opening comprising three sections, one being in the plane of opening, another being offset laterally from the opening with its end adjacent said first mentioned section spaced therefrom to define a ventilating passageway and the third section comprising an intermediate section disposed at said passageway for controlling the flow of air therethrough, said first section being supported to be raised and lowered in said opening without interfering with the operation of the third section.

4. A ventilating closure for an automobile vehicle window opening comprising three sections, one being in the plane of opening, another being offset laterally from the opening with its end adjacent said first mentioned section spaced therefrom to define a ventilating passageway and the third section comprising an intermediate section disposed at said passageway for controlling the flow of air therethrough, said second mentioned section being fixed and the other two sections being movable, one transversely and the other vertically.

ARTHUR P. FERGUESON.